Feb. 14, 1933.  A. OSWALD  1,897,275
CINEMATOGRAPHIC FILM
Filed Sept. 22, 1928
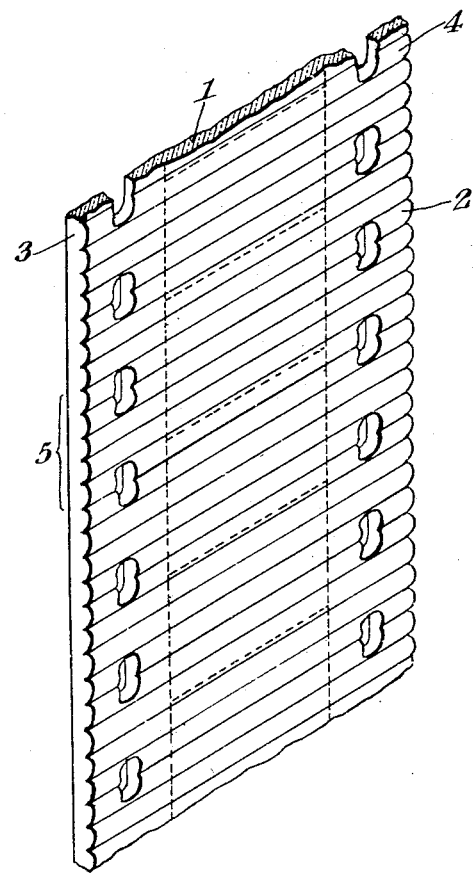
INVENTOR
Andre Oswald
BY
Arthur Wright
ATTORNEY Patented Feb. 14, 1933

1,897,275

UNITED STATES PATENT OFFICE

ANDRÉ OSWALD, OF PARIS, FRANCE, ASSIGNOR, BY MESNE ASSIGNMENTS, TO KELLER-DORIAN COLORFILM CORPORATION, OF NEW YORK, N. Y., A CORPORATION OF DELAWARE

CINEMATOGRAPHIC FILM

Application filed September 22, 1928, Serial No. 307,601, and in France October 17, 1927.

As is known in the art in connection with the Keller-Dorian process of producing photographs and moving pictures in colors, microscopic parallel networks are made use of which have cylindrical lenticulations and which are established on the supports of the films.

The object of my invention is to provide a film of the character described in which the film may be bent out of shape either as an arcuate curve or as a sinusoidal curve of regular or irregular form in the direction of travel thereof, without any undue influence on the network of the minute cylindrical lenticular elements provided on the support thereof The single figure of the drawing represents a perspective view on an exaggerated scale of a section of film constructed in accordance with my invention Troublesome orientation of a film of the type above referred to may take place in three ways; first, parallel to the edges of the film in the direction of the length or development of the film; second, oblique with respect to the edges of the film; and, third, perpendicular to the edges of the film Up to the present goffered films having an inclined network have been made use of.
In order to fix the value of the inclination, it is necessary during projection of the film, to cause the image of the weft of the goffering or lenticular elements to disappear by giving thereto a certain displacement velocity in order that the eye of the spectator does not have time to notice it. Manifestly, this condition dispenses with the problem of lenticulations disposed parallel to the edges of the film. The tendency is thus to employ either a series of oblique lenticulations, as has been done up to the present, or a series of perpendicular lenticulations.

In the case of a series of oblique lenticulations, if in every four or five images, for example, a definite point of a line lenticulation is replaced by a homologous point of a neighboring line, experience has shown that the weft is no longer visible to the eye during the movement and the inclination of the lines of the lenticulations is practically negligible.

The said inclination while satisfactory enough for the purposes indicated, nevertheless presents serious disadvantages.

First, during the goffering operation, the film with oblique lenticulations has a tendency to "hunt", that is, to become displaced transversely on the goffering cylinder instead of remaining in the same place. For this reason it becomes necessary to make use of auxiliary adjustment in order to hold the film in the proper direction.

Second, the film goffered parallel or oblique with respect to the edges of the film has a tendency to warp in the transverse direction. This deformation which is a function of the hygrometric state of the film, results in the introduction of "dominating colors" in the projection.

By the phrase "dominating colors" is meant the phenomena of producing an excessive quantity of a particular color which takes place when a warped film is projected, so as to produce the defect of forming the image of the sensitive surface not in the color selecting filter placed in the projecting objective, but well in front or to the rear of the said objective depending upon whether the deformation is concave or convex.

This defect becomes practically translated by a progressive changing of colors perpendicular to the direction of the color goffering, passing from blue to red from one edge to the other of the image. This is what constitute the "dominating colors".

The defect of the "dominating colors" can exist not only during projection but also in taking exposures and during reproduction of the originals.

Furthermore in apparatus for taking exposures, for reproducing and for projecting, it is difficult to establish the film in a perfect plane and it is necessary to strongly press the film in all directions but at the expense of excessive strain on the perforations and streaking either the support of the emulsion.

Referring to the drawing, my improved film consists of a support 1 on the surface of which are formed minute cylindrical lenticular members 2, extending in a direction perpendicular to the edges 3 and 4 of the support, and hence perpendicular to the direction of travel of the film. At 5 is conventionally shown an image on the support 1.

I have discovered by experiment that if the diameter of the cylindrical lenticular elements 2 is contained an uneven number of times in the distance represented by the height of the image 5, I am able to overcome the disadvantages hereinbefore set forth.

In other words if $d$ be the diameter of a lenticular element and $h$ be the height of an image on the film and R be the ratio of $h$ to $d$, then $$R = \frac{h}{d}$$

wherein, R is an uneven number, or rather a mixed number.

My improved film has the following advantages:—

First, during goffering, the lines of the lenticulations being parallel to the generatrix of the goffering cylinder, the film will have no tendency to "hunt".

Second, during projection, the weft will remain invisible since there will never be coincidence between two homologous points of lines corresponding to the same point of the image.

Third, if the film warps, this deformation will produce no optical effect since it is perpendicular to the direction of the cylindrical diopters and hence there will be no dominating colors.

Having described my invention what I claim as new and desire to secure by Letters Patent is:

1. As a new industrial product, a cinematographic film comprising a support having a series of successive images adapted to be reproduced in colors to produce moving pictures, and a plurality of microscopic lenticular elements on the support, each in the form of a line located at right angles to the side of said support, the ratio of the height of said images to the height of each of said elements being a mixed number and the dividing lines between the lenticular elements being so located as to be placed in different relative positions on the successive images.

2. As a new industrial product a cinematographic film comprising a support having a series of successive images adapted to be reproduced in colors to produce moving pictures and a plurality of microscopic cylindrical lenticular elements, on the support each in the form of a line located at right angles to the side of said support, the ratio of the height of said images to the height of each of said cylindrical elements being a mixed number and the dividing lines between the lenticular elements being so located as to be placed in different relative positions on the successive images.

3. A cinematographic film having successive images thereon and linear microscopic lenticular elements arranged at right angles to the side of the film adapted to reproduce the images so as to produce motion pictures therefrom, the lines of lenticular elements for a particular image being located in a materially different position longitudinally of the image from the position of the lines of lenticular elements as to the succeeding image.

In testimony whereof I hereunto affix my signature.

ANDRÉ OSWALD.